Patented Dec. 18, 1951

2,578,841

UNITED STATES PATENT OFFICE 2,578,841

PRODUCTION OF ETHYLENE OXIDE

Nat C. Robertson and Robert T. Allen, Corpus Christi, Tex., assignors to Celanese Corporation of America, a corporation of Delaware No Drawing. Application January 30, 1948, Serial No. 5,503

1 Claim. (Cl. 260—348.5)

This invention relates to the oxidation of ethylene and relates more particularly to the catalytic vapor phase oxidation of ethylene to ethylene oxide.

An object of this invention is the production of ethylene oxide in an efficient and economical manner by the catalytic vapor phase oxidation of ethylene.

Another object of this invention is the provision of an improved process for the catalytic vapor phase oxidation of ethylene to ethylene oxide employing a fluidized oxidation catalyst.

A further object of this invention is the preparation of improved oxidation catalysts suitable for use in catalytic oxidation operations and, more particularly, for the vapor phase oxidation of ethylene to ethylene oxide wherein the oxidation catalyst is employed in fluidized form.

Other objects of this invention will appear from the following detailed description.

The catalytic vapor phase oxidation of ethylene to ethylene oxide with air or oxygen has been the object of a considerable amount of research since the commercial feasibility of the process was established. During the oxidation reaction which takes place, part of the ethylene employed is oxidized to ethylene oxide and part forms carbon dioxide. The reaction of that part of the ethylene going to form carbon dioxide is highly exothermic and, as a consequence, the maintenance of close and accurate temperature control throughout the reaction zone is quite difficult. While some modifications of the process which have been made to improve the efficiency and yields of the catalytic oxidation reaction have met with some degree of success, the basic efficiency and operability of the process heretofore employed are still far from being entirely satisfactory.

We have now found that the catalytic vapor phase oxidation of ethylene to ethylene oxide employing air as the oxidizing agent may be carried out with a high degree of efficiency and with close and accurate temperature control, if the oxidation is effected in the presence of a novel powdered or granular oxidation catalyst which is maintained in a fluidized, or mobile, state in the reaction zone in which said oxidation reaction is effected. Not only does our novel oxidation process produce a high order of conversion of ethylene to ethylene oxide but the efficiency of said process, namely, the percentage of the total oxidation product which is ethylene oxide, is also quite high. Thus, conversions of 30 to 35% are readily obtained by our novel process with efficiencies of the order of 60 to 75% being achieved.

The powdered or granular catalyst composition which we employ in carrying out said catalytic oxidation process with the catalyst in a fluidized state is a novel one and has proven to be highly effective for this oxidation reaction. Our novel catalyst comprises silver deposited on an inactive alumina support in admixture with a catalyst promoter comprising both barium peroxide and an oxide of zinc or copper. Our novel catalyst composition preferably comprises, for each 100 parts by weight of the inactive alumina support, from 10 to 70 parts by weight of silver, from 3 to 10 parts by weight of barium peroxide and from 0.1 to 2.0 parts by weight of zinc or copper oxide.

The catalysts are prepared by adding to an aqueous solution of the nitrate or acetate salts of silver and copper or zinc, or both copper and zinc, an aqueous solution of some alkali metal hydroxide, as sodium or potassium hydroxide. This addition precipitates the oxide of silver and the hydroxide of the other metal or metals present. The precipitate is filtered off and combined, in the proper proportions, with the support material. The support material found most desirable is inactive alumina ground and screened to finer than 80 mesh. The barium peroxide promoter may now be added. A small amount of water is added to insure adequate mixing of precipitate and support material and the whole mixture evaporated to dryness with constant stirring, and finally dried at about 110° C. The dried composition is then screened, preferably through a 50 to 200 mesh screen, say about 80 mesh. The powdered alumina obtained is coated with metal oxide and/or hydroxide and is then placed in the oxidation reactor and heated to about 260° C. in the presence of air. Since the vapor pressure of oxygen over silver oxide reaches about one atmosphere at about 180° C., the silver oxide decomposes and leaves a thin coating of silver on the inactive alumina support in admixture with the mixture of barium peroxide and zinc or copper oxide which is employed as the catalyst promoter. The final composition obtained constitutes our novel catalyst.

In lieu of adding the promoters to the silver nitrate or acetate solution prior to precipitation of the silver oxide therefrom, the silver oxide may first be precipitated from the aqueous silver nitrate or acetate solution and then mixed with the inactive alumina supporting material, the barium peroxide and the zinc or copper salt in the necessary amounts to yield a catalyst having the desired proportions of silver, inactive alumina and promoters in the mixture, after the decomposition of the silver oxide is effected by the heat treatment. The resulting mixture is then ground as described above to reduce the catalyst composition to a finely-divided form and then heated to decompose the silver oxide to metallic silver and the copper or zinc salt to the oxide.

To effect the oxidation of ethylene to ethylene oxide in accordance with our novel process the catalyst bed of finely-divided discrete particles is heated to the desired reaction temperature, which is normally from about 200 to 350° C. and preferably, about 230 to 320° C., and a mixture of air and ethylene is passed upward through the catalyst bed at a velocity sufficient to fluidize the finely-divided catalyst.

Fluidization is obtained when the upward forces exerted on the catalyst particles by the flowing gaseous reaction mixture offset the downward force of gravity on said particles. The resulting fluidization of the gas-borne catalyst particles may comprise either aggregative fluidization or particulate fluidization. Aggregative particles may comprise either aggregate fluidization are employed and the discrete solid catalyst particles are suspended intermittently in small groups or aggregates, while particulate fluidization may be readily achieved at higher gaseous flow rates wherein the discrete catalyst particles are suspended separately and exert little force upon each other.

In effecting the catalytic oxidation of ethylene to ethylene oxide with air employing the novel catalyst compositions described, in fluidized form, the volume ratio of air to ethylene in the reaction mixture is preferably from about 8 to 1 to about 10 to 1 and may be as high as about 20 to 1. The flow rate of the reaction mixture is preferably so controlled that the contact time of the reaction mixture of ethylene and air with the fluidized catalyst is of the order of about 0.5 to 2.5 seconds.

Although, as pointed out above, the combustion of a part of the ethylene to carbon dioxide takes place during said catalytic oxidation with the generation of substantial quantities of heat due to the highly exothermic nature of said reaction, we have found that by our novel process, wherein the oxidation is effected with the catalyst in a fluidized state, the formation of hot spots with consequent localized overheating is avoided and close and accurate temperature control throughout the reaction zone may be readily achieved.

The gaseous reaction mixture obtained as the product of our novel process comprises an equilibrium mixture of ethylene, oxygen and ethylene oxide together with some carbon dioxide, nitrogen and water and the ethylene oxide may be separated from the reaction gases in any convenient manner and the unreacted ethylene recycled.

In order further to illustrate our invention, but without being limited thereto, the following examples are given:

Example I

To 100 parts by weight of silver nitrate dissolved in 2000 parts of water are added one part by weight of cupric nitrate and then 1130 parts by weight of a 2.8% by weight aqueous solution of sodium hydroxide. A precipitate comprising silver oxide and cupric hydroxide is formed and filtered off. About 30 parts by weight of this precipitate and 4.5 parts of barium peroxide are mixed with 100 parts by weight of inactive alumina which has been ground to pass an 80 mesh screen. About 100 parts of water are added to this mixture and the composition thoroughly mixed. The water present is slowly evaporated from the mixture while the latter is constantly stirred and the partially dry mixture obtained completely dried by heating at 110° C. The dried, coated alumina particles are again screened through an 80 mesh screen and the finely-divided material heated in air to 260° C. The silver oxide is decomposed at this temperature and leaves a coating of silver on the alumina support. The catalyst, thus obtained, may then be employed in accordance with our novel process for the fluid catalytic vapor phase oxidation of ethylene to ethylene oxide. The catalyst consists of 100 parts by weight of alumina, 26 parts by weight of metallic silver, 4.5 parts by weight of barium peroxide and 0.3 parts by weight of cupric oxide.

Example II

To 100 parts by weight of silver nitrate dissolved in 2000 parts by weight of water are added 1 part by weight of zinc acetate. 1130 parts by weight of a 3.8% solution of potassium hydroxide are added to the above solution and a precipitate comprising silver oxide and zinc hydroxide is formed. About 50 parts by weight of the precipitate and 7.5 parts by weight of barium peroxide are mixed with 100 parts by weight of finely-divided, inactive alumina, 100 parts by weight of water are added and, after thorough mixing, the water is evaporated therefrom. After being dried thoroughly by heating at 110° C. the coated alumina particles obtained are then screened through an 80 mesh screen and the finely-divided screened particles heated in air at 260° C. until the silver oxide decomposes to metallic silver. The catalyst is now ready for use for the oxidation of ethylene to ethylene oxide with the catalyst in a fluidized state. The novel catalyst prepared as described above consists of, for each 100 parts by weight of inactive alumina supporting material present, 43 parts by weight of metallic silver, 7.5 parts by weight of barium peroxide and 0.5 part by weight of zinc oxide.

Example III

A gaseous mixture of ethylene and air in a ratio of 10 volumes of air for each volume of ethylene is passed upward through a reactor containing a bed of the oxidation catalyst prepared in accordance with Example I, for example, heated to a temperature of 238° C. The flow of the gaseous ethylene-air reaction mixture through the reactor and through the catalyst bed is kept sufficiently high to maintain the catalyst particles in a fluidized state. The reactor employed is of such dimensions that the gaseous ethylene-air mixture is in contact with the fluidized catalyst for an average contact time of about 1.0 to 1.5 seconds. The gaseous reaction product formed is then passed through a catalyst trap where any entrained catalyst particles are separated. Analysis of the exit gas stream shows that 31% of the entering ethylene is converted to ethylene oxide and 11% is converted to carbon dioxide and water. Thus 74% of the ethylene reacted is converted to ethylene oxide, i. e., the efficiency of the process is 74%. Up to seven hours of continuous operation or several weeks of intermittent operation resulted in no loss in activity of this type of catalyst.

It is to be understood that the foregoing detailed description is given merely by way of illustration and that many variations may be made therein without departing from the spirit of our invention.

Having described our invention, what we desire to secure by Letters Patent is:

Process for the production of ethylene oxide employing a fluidized catalyst, which comprises passing a mixture of air and ethylene in a ratio of 10 volumes of air for each volume of ethylene through a heated reaction zone maintained at a temperature of 238° C. and containing an oxidation catalyst comprising 80 mesh inactive alumina having deposited thereon for each 100 parts by weight of alumina 43 parts by weight of silver, 7.5 parts by weight of barium peroxide and 0.5 part by weight of zinc oxide, the time of contact between the mixture and the catalyst being between about 1.0 and 1.5 seconds, and maintaining the flow of the gaseous reaction mixture through the heated reaction zone at a rate sufficiently high to fluidize the finely-divided catalyst particles.

NAT C. ROBERTSON.
ROBERT T. ALLEN.

REFERENCES CITED

The following references are of record in the file of this patent:

UNITED STATES PATENTS

| Number | Name | Date |
| --- | --- | --- |
| Re. 20,370 | Lefort | May 18, 1937 |
| 1,937,381 | Bond | Nov. 28, 1933 |
| 1,937,728 | Storch | Dec. 5, 1933 |
| 2,138,583 | Langwell et al. | Nov. 29, 1938 |
| 2,238,474 | McNamee et al. | Apr. 15, 1941 |
| 2,395,875 | Kearby | Mar. 5, 1946 |
| 2,424,086 | Bergsteinsson et al. | July 15, 1947 |
| 2,430,443 | Becker | Nov. 11, 1947 |